Aug. 23, 1960
R. M. H. GARCEAU
2,950,152
PACKINGS AND THE LIKE
Filed Sept. 13, 1957
2 Sheets-Sheet 1
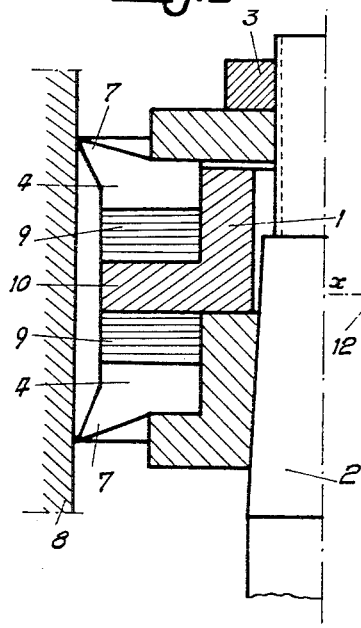
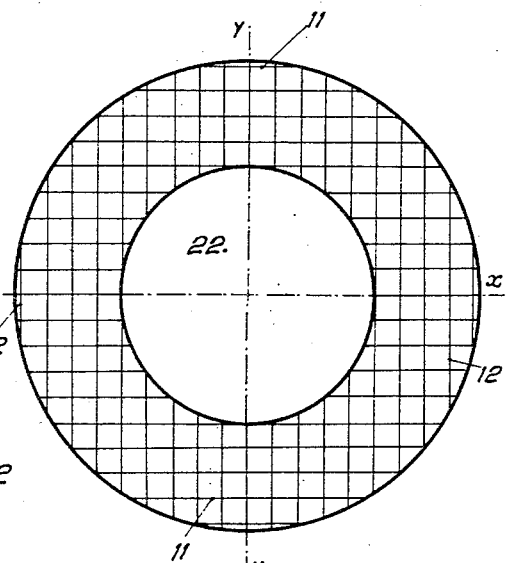
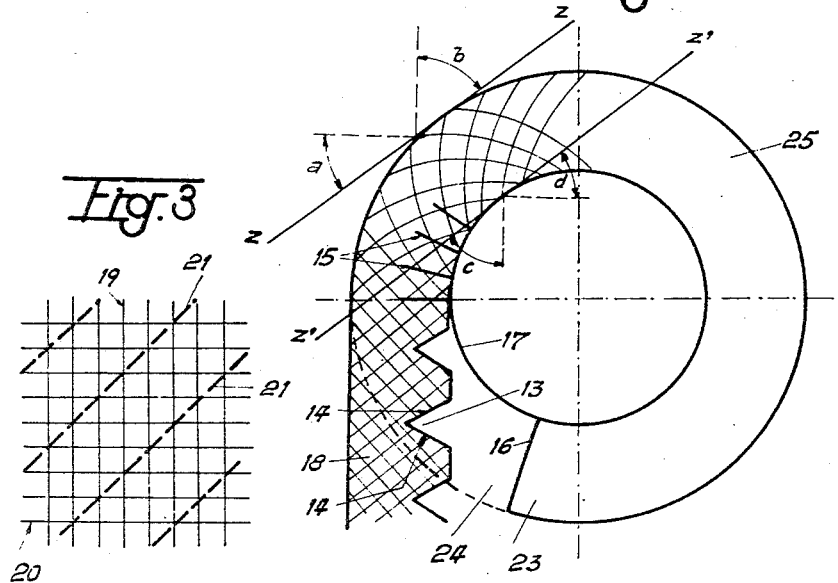
INVENTOR
ROGER MAURICE HENRI GARCEAU.
BY
Christy, Parmelee & Strickland.
ATTORNEYS.

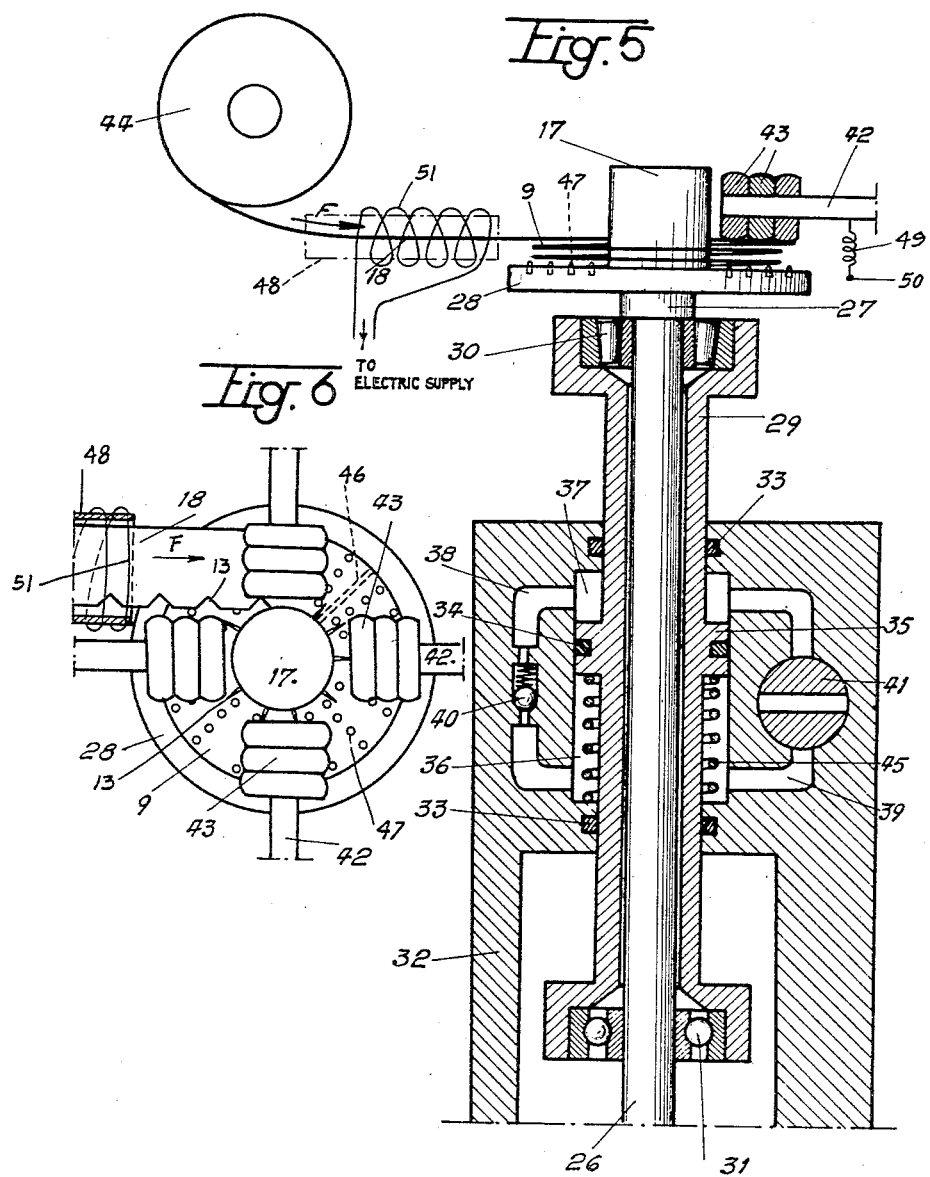

United States Patent Office 2,950,152
Patented Aug. 23, 1960

2,950,152

PACKINGS AND THE LIKE

Roger Maurice Henri Garceau, Colombes, France, assignor to S. N. Marep, Paris, France, a societe anonyme of France Filed Sept. 13, 1957, Ser. No. 683,895

Claims priority, application France Sept. 21, 1956

9 Claims. (Cl. 309—23)

The present invention relates to packing and analogous elements reinforced with layers of fabric, and is concerned more particularly with piston packings of the kind made of rubber reinforced by layers of woven fabric and formed with a central hole, without being limited to this kind.

The invention consists primarily in cutting inherently flaccid ribbon-like strip elements or bands of fabric on the bias, i.e. in a direction forming an acuate angle with the woven threads, and winding flat these bands on edge, that is to say around an axis perpendicular to the plane of the fabric, in such a manner as to orient the threads disposed at the outer and inner edges of the band at an angle in relation to planes tangential to these edges. The fabric reinforcement thus constituted enables a product to be obtained which is very resistant to abrasion and is capable of economic production because the waste of fabric is considerably diminished and the assemblage of the layers of fabric can be effected rapidly and with reduced labor.

Fabric rings in which the threads at the edges are inclined at an angle different from zero to planes tangential to such edges are disclosed in the U.S.A. Patent No. 1,622,048. Such rings can be produced by various methods but an important object of the present invention is to provide a very advantageous process for the manufacture of the said rings. A further object is to produce a pre-formed sealing gasket or packing element reinforced by a pile of fabric rings of this kind or by a helical winding of a fabric band suitable for the production of such rings and to provide a process for the manufacture of a packing reinforced by such rings or helical windings.

In carrying out the invention, a process for the production of a fabric ring intended for the reinforcement of a piston packing or analogous part, consists in cutting on the bias a piece of fabric to form flaccid ribbon-like strips, the lines of cutting being inclined at 45°, for example, to the threads of the fabric, then cutting in one longitudinal edge of each strip notches preferably of V-form, then winding flat the band on edge around a mandrel in such manner that the notched edge is against the mandrel and the notches close by their sides coming together. A length of such strip may be cut off equal to the developed length of a ring formed by the winding and the ends of such length may be united, for example by adhesive, to form a closed ring. Or, the strip may be wound helically in the manner indicated above with the notches against the mandrel so that a continuous assemblage of spirals is obtained as a pile and in the form of a flat ring.

In the production of a piston packing, a pile of fabric rings produced as above described, or a continuous assemblage of fabric spirals, is placed in a mold, the latter then being filled with rubber or analogous material which is finally vulcanized under pressure to produce a consolidated packing ring.

In order to enable the invention to be readily understood, reference is made to the accompanying drawings illustrating, by way of example, practical methods and means for carrying it out, in which drawings:

Fig. 1 is a half longitudinal section of a piston fitted with reinforced packings;

Fig. 2 is a plan of a fabric ring as heretofore used for reinforcement of a packing;

Fig. 3 is a plan of a piece of fabric to be cut on the bias for the production of strips to be wound into reinforcement rings according to the present invention;

Fig. 4 is a plan showing the winding around a mandrel of a fabric strip out in accordance with Fig. 3;

Fig. 5 is a vertical section, partly in elevation, illustrating apparatus adapted for carrying out the method of the invention; and Fig. 6 is a diagrammatic plan of the apparatus seen in Fig. 5.

In Fig. 1, a pump piston 1 is mounted on a piston rod 2 and fixed thereon by a nut 3. The piston comprises a central collar 10 and is fitted with two packing rings 4 formed at their extremities with lips 7 for insuring tightness in the pump cylinder 8.

The packings 4 at respective sides of the collar 10 are reinforced by an assemblage of rings or layers of fabric 9. One of the rings or layers of fabric as heretofore produced is shown in Fig. 2, and it is obtained by simultaneously stamping a number of superposed layers of fabric. This results in considerable waste, because the internal disc 22, which corresponds to the central hole in the packing and occupies a considerable area of the fabric from which the ring is produced, can not be utilized. Another drawback is a loss of resistance to abrasion caused by the friction of the piston in the cylinder. In use, the ring in Fig. 2 undergoes rapid peripheral wear at the points of intersection with axes $x$—$x$ or $v$—$v$ parallel to the threads. This is due to the fact that the weft threads 11 and warp threads 12 are oriented according to chords of arcs of the inner and outer circles bounding the fabric ring. At the said points, the length of chord is very small, as will be seen from Fig. 2, so that the short threads at these points are not maintained in the mesh of the fabric and are rapidly removed by friction.

Experience has shown that a piston packing such as is shown in Fig. 1 perishes by deterioration of the reinforcement 9.

Comparative tests carried out with mud pumps used in boring operations have shown that piston packings reinforced by fabric rings of the kind seen in Fig. 2 had a durability several times less than that of packings reinforced in accordance with the present invention.

According to the present invention, the reinforcement 9 of a packing 4 is obtained in the following manner: A piece of reinforcing fabric is seen in Fig. 3 with weft threads 19 and warp threads 20 forming a network of square mesh. This fabric after suitable treatment by a known process in order to be impregnated and covered with rubber or the like, is cut into strips along straight parallel lines indicated by the broken lines 21, these being inclined at about 45° to the threads. Waste is practically negligible in such cutting. Then, several bands are bonded endwise together forming a flaccid ribbon-like strip of great length, and each such long strip is formed, along one of its longitudinal edges, with triangular notches 13, as shown in Fig. 4, which also shows the winding of such a strip around a mandrel or roller 17, the notches being situated towards the roller 17 and at the interior of a reinforcement ring thus produced.

The cutting of the notches 13 is necessary to permit of the edgewise winding of the strips. During such winding, the sides 14 of a notch 13 approach one another, as seen in Fig. 4, until they meet and form a slit.

15 which extends a short distance into the reinforcement and will become united during the subsequent molding of the packing. The weft and warp threads, oriented at about 45° to the longitudinal edges of the band 18, before the winding, now acquire a curved formation during the winding, as will be clear from Fig. 4, and are found situated in the reinforcement ring at various angles $a$, $b$, $c$ and $d$, all of which are different from zero, relatively to the tangents, $z$—$z$ and $z'$—$z'$ to the outer and inner circular contours of the ring. It is to be observed that in no case do the threads follow the direction of the said tangents as is the case with the short threads opposite the points $x$—$x$ and $v$—$v$ in Fig. 2, so that the weakness at such points is avoided in a ring wound in the manner described with reference to Fig. 4. Moreover, the waste of fabric, due principally to the cutting out of the notches 13, is much inferior to that which is inevitable in the case of rings produced as described with reference to Fig. 2.

The process described with reference to Fig. 4 permits therefore of making individual reinforcement rings 25 divided on a radius 16, by cutting flaccid ribbon-like bands of the appropriate length, the extremities 23 and 24 of such rings being appropriately united, as by adhesive, if desired. Such rings may then be piled in a mold. Each ring being made from a rubber impregnated and covered fabric, it suffices to slightly heat the rings during piling for bonding the rings together. A packing ring is produced by placing the piled rings on the bottom of the mold, then filling the mold with rubber suitably treated, if it is desired that the packing ring includes a body of rubber like material without reinforcement, and then vulcanizing the molded packing ring containing the fabric rings as reinforcement. However, by using a strip of great length it is possible to augment the solidity and strength of the reinforcement and to reduce the cost of labor involved in the piling of individual reinforcement rings. Thus, instead of producing individual rings, the invention makes it possible to produce in a single operation and in continuous formation all the rings required to make up the reinforcement 9 of the packing 4 in Fig. 1. For this purpose, a flaccid ribbon-like band 18 of great length is edgewise wound helically flat around the mandrel or roller 17, the layers of reinforcement being continuously superposed on one another as thin spirals or turns until the desired overall thickness of reinforcement, as measured in the direction of the axis of the mandrel or roller 17, is obtained.

The notches 13 facilitate the edgewise winding flat of the strip 18. In fact when this flaccid strip is of considerable width and if it were not formed with notches, the edgewise winding thereof around the mandrel or roller 17 would not be possible without concave and convex crinkling of the band. Another drawback would be a considerable tractive effort exercised upon the threads which would set up a risk of breakage during winding. The cutting of the notches 13 not only avoids the drawbacks aforesaid but also has an unexpected and very important result. In practice, despite the presence of the notches, it is impossible to obtain a perfect planeness of the ring 25 in Fig. 4. In practice, moreover, the small tongues bordered by the sides 14 of the notches 13 of a spiral become entangled or overlapped, as also do the tongues of one spiral with those of another. Nevertheless, after pressure has been applied to the reinforcement in the mold during the vulcanizing process, the final product is flat, and tests have shown that there is obtained an enhanced rigidity of the product and an increased resistance to wear and tear of the layers in the vicinity of the central hole of the packing, this being a technical effect of great advantage, for example in the application of the fabric reinforcement to the packings of stuffing boxes for piston rods.

The helical edgewise winding of the flaccid ribbon-like strip 18 is not easily performed manually and is therefore inclined to be costly, but it becomes industrially profitable by the employment of mechanical winding means, such as that provided by the invention and hereinafter described by way of example.

The winding means in Figs. 5 and 6 comprises a vertical spindle 26 which is axially slidable and is driven by a motor not shown. This spindle 26 is mounted within a hollow piston rod 29 with the interposition of an upper roller thrust bearing 30 and a lower ball thrust bearing 31. The piston rod 29, which is prevented from turning, slides with the spindle 26 in a cylinder 32. Tightness between the piston rod and the cylinder is afforded by packings 33 and 34, the latter surrounding an annular piston 35 formed on the rod 29. The cylinder 32 comprises lower and upper spaces 36 and 37 filled with oil and separated from one another by the annular piston 35. A helical compression spring 45 is lodged in the space 36 and continuously presses upwardly against the annular piston 35.

Ducts 38 and 39 permit the communication between the spaces 36 and 37. A non-return valve 40 prevents flow of oil through the duct 38 from the space 37 down to the space 36 but permits upward flow from 36 to 37. The duct 39 is closable by means of a cock 41. The spindle 26 is formed at its upper end with a shoulder 27 which rests upon the bearing 30. Above this shoulder it is formed or provided with an entrainment plate 28 and terminates in a stub 17 which serves as the mandrel or roller referred to in the description of Fig. 4. The reinforcement 9 is formed by holding flat and helically edgewise winding flat the flaccid ribbon-like band 18 around the stub 17 the band being unrolled from a supply reel 44 in the direction of the arrow F. The plate 28 is provided with anchorage and winding means for the band or strip 18. Said anchorage means may include a radial slot 46 (shown in dotted line in Fig. 6) into which the end of the strip 18 is inserted, as usual for example for winding the film around the receiving reel of a camera. Winding means may include radial rows of projecting needles or the like 47 secured in holes of the plate 28 and easily removable when worn or broken. Furthermore, a suitable inclinable guiding means 48 is provided for guiding the strip 18 tangentially to the stub or mandrel 17. The drawing intentionally exaggerates the spacing of the superposed spirals forming the reinforcement 9 in order the better to show the helical form of the winding. In reality, the spirals are pressed closely one against another by the effort exerted by the spring 45. The superposed spirals forming the reinforcement 9 are pressed upwardly against pressure rollers 43 which turn freely around horizontal axles 42 mounted on the framing (not shown) of the apparatus. It will be apparent that the speed of revolution of the rollers 43 will be greater in the case of those rollers disposed farther from the axis of the spindle 26 than in the case of those disposed nearer to such axis. The rollers 43 are suitably prevented from having any movement along the axles 42. The axles 42 (of which there may be four spaced 90° apart, as in Fig. 6) are articulated upon the said framing so that they can be swung into the operative position in which they are shown and, when a winding operation is finished, can be swung out clear of the plate 28. Whilst the axles 42 are in the operative position illustrated, they are rigidly fixed in such position by appropriate fastening means. For example, traction springs 49 anchored at 50 to a part (not shown) of the framing are provided for biasing the rollers 43 downwardly into contact with the turns of the coil 9.

The winding process includes the following steps: The sheet of woven fabric from which is to be made the reinforcement is at first suitably impregnated and covered with natural or synthetic rubber in a known manner. It is then cut on the bias into strips, which are bonded endwise together in the desired lengths. Notches are cut on a longitudinal edge of the long strip thus formed, and the strip is wound around a supply reel 44 in a conventional manner, with interposition of a non-adhesive strip between successive turns of fabric, in order to avoid bonding of the turns due to the covering of rubber. After the reel 44 has been placed in the winding machine the strip is then unwound from the reel 44 and is guided flat towards the plate 28, tangentially to the stub 17, by guiding means 48. During the unwinding of the band 18 from the reel 44, the operator pulls on the non-adhesive strip between successive turns of the band 18, in a conventional manner, and said strip is either wound around a suitably provided (not shown) drum or thrown away. The end of the strip 18 is inserted into the slot 46 and the pressure rollers 43 are brought into contact with the upper face of the first turn of strip 18 and press this strip downwardly against the needles or gripping means 47. Consequently, when the plate 28 will rotate, the needles 47 will drive the band 18 and wind the same around the stub 17.

Moreover, there are disposed on the path of the band or strip 18 from the reel 44 to the plate 28, and in the neighborhood of the guiding means 48, electric or other heating means 51 for pre-heating the strip 18 and softening the rubber covering. Such a pre-heating permits for the successive superposed turns of the band 18 on the plate 28 to be bonded together under the combined pressure of the rollers 43 and of the spring 45 during the winding process.

The winding arrangement in itself operates as follows: At the start of an operation, the plate 28 occupies its highest position and the cock 41 is closed. After the end of the strip 18 has been inserted between the plate and the rollers 43, the spindle 26 is put into rotation. As already stated, the plate 28 is fitted with gripping means 46, 47 so that by its rotation it entrains the band 18 and winds it around the stub 17. According to the number of spirals added to the assemblage forming the reinforcement 9, so the table 28 descends and the piston 35 compresses the spring 45 and forces oil from the space 36, past the valve 40 and through the duct 38 into the space 37. The reinforcement 9 remains compressed owing to the effort of the spring 45 which maintains the pressure required for entraining the band 18 and winding it. The pressure of the springs 45 and 49 is sufficient, together with the pre-heating of the band 18 through the heating means 51, for softening the rubber covering of the strip and for pre-vulcanizing the reinforcement 9 sufficiently for obtaining on the plate 28 a body of impregnated fabric the superposed plies or turns of which are firmly bonded together and cannot be separated from one another. As a matter of fact, if the spirals were not kept in compression, there would be a risk of deformation of the spirals by reason of the resistance of the fabric to taking the curvature imparted to it in the winding. When the reinforcement 9 has acquired a sufficient thickness, the motor driving the spindle 26 is stopped and the band 18 is severed. These operations may be effected automatically by known means not illustrated. Then, the axles 42 are unfastened and swung clear of the plate 28 so that the reinforcement can be lifted from the latter. The plate 28 can not rise again at this time because it is held down by the oil imprisoned in the space 37 and blocking upward movement of the annular piston 35. The cock 41, however may now be opened to give free communication between the spaces 36 and 37, whereupon the plate 28 rises under the action of the spring 45 on the piston 35 which forces the oil from the space 37 and through the duct 39 into the space 36. A fresh operation can then be commenced after re-closing the cock 41.

After removing of the fabric reinforcement 9 from the plate 28 and stub 17, said reinforcement is placed on the bottom of a mold of known type and is vulcanized under a pressure of about 250 kg./cm.$^2$ and at a temperature of about 280° C., in a conventional manner. If it is desired to have a packing formed of a fabric reinforced body at one end and a body of rubber or the like forming the remaining portion, it suffices to use a mold deeper than the height of the reinforcement 9 and to fill this mold with rubber or the like before vulcanizing under pressure.

It is to be understood that the above described mode of carrying out the invention has been given by way of a non-limitative example and that modifications of detail are possible without departing from the spirit of the invention. In particular, the invention is not limited to packings for use with parts having an alternating movement such as piston packings and stuffing boxes, nor even to packings in general but it extends to all parts made from rubber, synthetic or natural, or plastic material, or any other material capable of being reinforced with fabric. The fabric used for reinforcement may be composed of fibers of natural organic origin, or of synthetic fibers or mineral fibers, or of metal threads, or other fibers. The parts reinforced need not be of circular section but may present an approximately polygonal countour with sufficiently rounded angles. The said parts, moreover, need not be of prismatic form for if the lines of cutting, 21 in Fig. 3, were not parallel straight lines, it would be possible to cut bands of varying width for the making of conical parts. The lines 21 could be curved for the making of conical parts either to suit the making of parts of appropriate form or to facilitate the winding of the strips 18 around the mandrel, roller or stub 17. The parallel straight lines of Fig. 3 could also be inclined at an angle different from 45°, for example to take count of the mode of weaving employed for the fabric to be used. The notches 13, instead of being triangular, could have a trapezoidal form or any other suitable form.

I claim:

1. The method of preparing a reinforced pre-formed hollow cylindrical packing element comprising the steps of, cutting a plurality of ribbon-like strips on the bias from a thin flaccid sheet of rubberized woven material, bonding edgewise together a plurality of said strips into a long strip, cutting a plurality of spaced notches along one longitudinal edge of each said long strip, winding each said long strip on edge to form a flat ring with the notched edge disposed inwardly, securing the adjacent ends of the wound strip together, arranging a stack of said rings coaxially to a mandrel, and forming said rings under heat and pressure into an integral hollow cylindrical body.

2. The method as defined in claim 1 wherein a stack of said rings are placed in a mold, placing a quantity of rubber like material in said mold and upon said stack, then shaping the material under heat and pressure to bond said rubber like material to said stack of rings in forming the reinforced hollow cylindrical packing element.

3. In the method of forming molded vulcanized hollow cylindrical packing elements having wear resistant rubberized fabric reinforcing rings integral therewith from a bias-cut ribbon-like strip element V-notched along one longitudinal edge, the steps of, forming an edge wound hollow helical coil from the strip element with the notched edge disposed inwardly, mounting said coil in a mold so as to retain the inner and outer diameters thereof, the depth of the mold corresponding to the height of the coil, and vulcanizing the whole under heat and axial pressure to form the packing.

4. In the method of forming molded vulcanized hollow cylindrical packing elements having wear resistant rubberized fabric reinforcing rings integral therewith from a bias-cut ribbon-like strip element V-notched along one longitudinal edge, the steps of, forming an edge wound hollow helical coil from the strip element with the notched edge disposed inwardly, mounting said coil in a mold so as to retain the inner and outer diameters thereof, the depth of the mold being greater than the height of the coil, filling the mold above said coil with a rubber-like cylindrical material, and vulcanizing the whole under heat and axial pressure to form an integral packing.

5. In the method of utilizing bias-cut rubberized inherently flaccid woven fabric material to form a substantially rigid integral packing element, the simultaneous step of holding flat an inherently flaccid ribbon-like strip element of said material and edgewise winding flat the same in its own plane about an axis exterior to said strip element and spaced from the nearest longitudinal edge of same.

6. The method of conjointly applying the generally known steps of bias-cutting rubberized woven fabric material and of V-notching a longitudinal edge of a strip of fibrous sheet material intended to be in contact with the periphery of a mandrel before winding said strip on said mandrel to compensate for the difference in diameter between the outer and inner peripheries of the wound strip, for making annular cylindrical packing elements for pistons and the like, such method comprising the steps of, softly heating a single flaccid ribbon-like strip element of said rubberized material while moving flat said strip element in its own plane; simultaneously edgewise winding flat the same on a mandrel under heat and axial pressure for insuring a tight bonding of the whole and particularly strengthening it at the eventually overlapping portions along said V-notched edge, into a radially continuous integral reinforced annular body; mounting said body so as to retain the inner and outer diameters thereof, and vulcanizing the whole under heat and axial pressure to form the cylindrical packing element.

7. The method of conjointly applying the generally known steps of bias-cutting rubberized woven fabric material and of V-notching a longitudinal edge of a strip of fibrous sheet material intended to be in contact with the periphery of a mandrel before winding said strip on said mandrel to compensate for the difference in diameter between the outer and inner peripheries of the wound strip, for making cylindrical packing elements for pistons and the like, such method comprising the steps of, heating a flaccid ribbon-like strip element of said material while moving flat said strip element in its own plane, simultaneously edgewise winding flat the same on a mandrel under heat and axial pressure for insuring a tight bonding of the whole and particularly strengthening it at the eventually overlapping portions along said V-notched edge, into a radially continuous integral reinforced annular body, mounting said body within a mold so as to retain the inner and outer diameter thereof, disposing a ring of a rubber-like material upon one end of the body and vulcanizing the whole under heat and axial pressure to form the element.

8. A reinforced pre-formed packing element for pistons or the like comprising at least an annular body portion made of bias-cut flaccid rubberized woven fabric material bonded under heat and pressure, wherein said body portion comprises a single continuous ribbon-like strip element of said material helically disposed flat coaxially to the axis of said annular body portion in consecutive thin turns, the individual thickness of which turns is substantially equal to the original thickness of said ribbon-like strip element, with all consecutive turns bonded to each other coextensively from the outer to the inner peripheries of said annular body portion.

9. A reinforced pre-formed packing element comprising a reinforced annular body portion as defined under claim 8, further comprising a non-reinforced annular body portion having outside and inside diameters respectively equal to the outside and inside diameters of said reinforced annular body, longitudinally extending from said reinforced annular body portion and bonded to the same into an integral packing.

References Cited in the file of this patent

UNITED STATES PATENTS

| | | |
|---|---|---|
| 1,622,048 | Pierson | Mar. 22, 1927 |
| 2,066,891 | Larson et al. | Jan. 5, 1937 |
| 2,265,898 | Galli | Dec. 9, 1941 |
| 2,400,533 | Buffington | May 21, 1946 |
| 2,542,593 | Sullivan | Feb. 20, 1951 |
| 2,638,391 | Heusser | May 12, 1953 |
| 2,703,739 | Koplin | Mar. 8, 1955 |

FOREIGN PATENTS

| | | |
|---|---|---|
| 313,662 | Germany | July 19, 1919 |
| 275,119 | Italy | June 12, 1930 |
| 379,629 | Great Britain | Sept. 1, 1931 |